United States Patent [19]

Andersson et al.

[11] Patent Number: 4,542,621

[45] Date of Patent: Sep. 24, 1985

[54] METHOD OF AND PLANT FOR COMBUSTION OF WATER-VAPOR GENERATING FUELS

[75] Inventors: Mikael Andersson; Per Hörlen; Wieland Kraemer, all of Västerås, Sweden

[73] Assignee: AB ASEA Atom, Västerås, Sweden

[21] Appl. No.: 579,592

[22] Filed: Feb. 13, 1984

[30] Foreign Application Priority Data

Feb. 15, 1983 [SE] Sweden .................................. 8300815

[51] Int. Cl.$^4$ ............................................... F02C 3/26
[52] U.S. Cl. ................................ 60/39.05; 60/39.464; 55/73; 423/242
[58] Field of Search .................. 60/39.02, 39.05, 39.12, 60/39.464; 55/20, 25, 27, 73, 84, 89; 423/242 R, 243

[56] References Cited

U.S. PATENT DOCUMENTS

| | | | |
|---|---|---|---|
| 3,531,664 | 9/1970 | Hals | 423/242 R |
| 3,839,849 | 10/1974 | Maniya | 55/73 |
| 4,048,286 | 9/1977 | Rossmaier | 55/73 |
| 4,078,390 | 3/1978 | Duvall | 55/73 |
| 4,150,953 | 4/1979 | Woodmansee | 55/73 |

Primary Examiner—Louis J. Casaregola
Attorney, Agent, or Firm—Watson, Cole, Grindle & Watson

[57] ABSTRACT

During combustion of a water-vapor generating sulfur-containing fuel, the pressurized flue gases are cooled, while extracting the main part of the latent heat of evaporation of the water vapor included and while removing sulfur impurities, using a coolant liquid in drop form in a scrubber. After having passed through the scrubber, the flue gases are mixed with a proportion of heated flue gases, which have previously passed through the scrubber, so that the temperature of the flue gases after said mixing exceeds the dew point for sulfuric acid in the flue gases. The flue gases are then heated in a heat exchanger and are thereafter expanded in an expansion machine to atmospheric pressure while reducing their temperature again without falling below the dew point for sulfuric acid.

20 Claims, 2 Drawing Figures

= = = = = a
======= b
• • • • • c
▬ ▬ ▬ ▬ d
- - - - - e

= = = a
= = b
· · · c
▬▭▬ d
- - - e

METHOD OF AND PLANT FOR COMBUSTION OF WATER-VAPOR GENERATING FUELS

BACKGROUND OF THE INVENTION

1. Field of the Invention

The present invention relates to a method of, and a plant for, the combustion of water- and/or hydrogen-containing fuels and for recovering energy from flue gases formed during the combustion as well as for cleaning such flue gases.

During combustion of fuels which contain water and/or hydrogen, the flue gases created during the combustion contain water vapor derived from the initial water content or created when the hydrogen is oxidised. This water vapor represents a large reserve of energy because of the very high latent heat of evaporation of water.

It is known to burn water-vapor generating fuels such as oil, coal or peat with a large water content under pressure in a combustion chamber and to cool the flue gases at a maintained pressure while condensing water from the water-vapor therein. (See Swedish published patent application No. 426,982.) The latent heat of evaporation of the water is thereby recovered as condensation energy and is transferred to a coolant used to cool the flue gases. Because of the fact that the condensation of the water vapor (steam) takes place at a supra-atmospheric pressure, the energy is recovered at a higher temperature level than if the condensation had taken place at atmospheric pressure. After cooling, the flue gases are subjected, according to a known technique, to a pressure reduction in an expansion machine. The energy absorbed by the expansion machine can then be usefully employed (e.g. for driving a compressor which compresses the combustion air supplied to the combustion chamber).

2. Description of the Prior Art

The flue gases from the combustion of water-vapor generating fuels which are also sulfur-containing comprise, in addition to water vapor, sulfur trioxide among other things. During cooling to temperatures of around 400° C., the sulfur trioxide combines with the water vapor to produce sulfuric acid in gaseous state. When cooling the flue gases to temperatures below the dew point of sulfuric acid, liquid sulfuric acid appears which gives rise to a very corrosive environment. During combustion of sulfur-containing water-vapor generating fuels in the manner described above, heat exchangers, conduits and chimneys of an especially acid-proof steel have been used, and the cooled exhaust gases have been maintained at as low a temperature as possible, in view of the corrosion problems described.

According to another known case, the cooled flue gases are subjected to such a rapid decrease of pressure in an expansion machine that their temperature, after having passed through the expansion machine, is sufficiently low for the impurities in the flue gases to be removed in liquid state, or in solid state, before the flue gases are discharged via a chimney. (See Swedish published patent application No. 427,691.)

SUMMARY OF THE INVENTION

The present invention sets out to counteract the corrosion problem by performing the cooling of the flue gases in a scrubber with a flow of water or other fluid in drop form to a temperature which is below the dew point for water in the flue gases under the prevailing conditions, by first supplying the cooled flue gases with hot flue gases and thereafter heating them in a heat exchanger to a temperature which is so high that the flue gases, when subsequently expanded to atmospheric pressure in an expansion machine under reduction of temperature, acquire a temperature which exceeds the dew point for sulfuric acid in the flue gases under the then prevailing conditions.

By maintaining the temperature of the flue gases, downstream of the scrubber, at a temperature which exceeds the dew point for sulfuric acid, no condensation of sulfuric acid can occur after the passage of the flue gases through the scrubber.

The invention, in its method and plant forms is set out in the following claims.

The water- and/or hydrogen-containing fuel may, among other things, consist of a slurry of coal or other solid carbon-based fuel in water, of peat, of wood, of water-containing oil or hydrogen-containing gas. The water content in water-containing fuels may be very high and amount to approximately 70 percent by weight.

At their outlet from the scrubber, the flue gases suitably have a temperature of 30° C. to 90° C. and preferably a temperature of 30° C. to 70° C. After the supply of the heated flue gases, which have previously passed through the scrubber, the flue gases suitably have a temperature which is from 2° to 35° C. or possibly from 2° to 15° C. higher than before the supply of the heated gases. At the inlet of the expansion machine, the flue gases suitably have a temperature of at least 150° C. and preferably a temperature of 150° to 850° C. After their passage through the expansion machine, the flue gases suitably have a temperature of 20° C. to 600° C. and preferably a temperature which lies above the temperature of the surrounding atmosphere.

The flue gases are preferably cooled before being subjected to the cooling for recovering the heat of evaporation of the water contained therein. At least in the event that during the combustion of the fuel there are not formed solid particles, which accompany the flue gases, the first-mentioned cooling preferably takes place without the temperature falling below the dew point for sulfuric acid in the flue gases under the conditions in question. In such a case, according to the method of the invention, the temperature of the flue gases, both before entering the scrubber and after the supply of hot flue gases after the passage of the scrubber, is maintained at a level which exceeds the dew point for sulfuric acid in the flue gases, whereby condensation of sulfuric acid only takes place in the scrubber. In the event that during the combustion solid particles are formed which accompany the flue gases, which is the case with solid fuels such as coal, a certain condensation of sulfuric acid in a cooling device located upstream of the scrubber can be tolerated. This is due to the fact that the solid particles have the ability to absorb any condensed sulfuric acid and thus prevent corrosion and clogging of the cooling device. The cooling device suitably consists of part of the same heat exchanger in which the flue gases are heated after their passage through the scrubber.

According to an advantageous embodiment of the invention, the combustion is performed with compressed air to which water has been added. By the supply of water to the combustion air, an improved efficiency in the gas circuit can be achieved. The added water can be drawn either from an external source or from water used as the coolant in the scrubber. The latter involves minimum losses in the water supply. However, when supplying water from an external source, a lower temperature of the flue gases can be obtained, as the supplied water can be expected to have a lower temperature than coolant recovered from the scrubber.

BRIEF DESCRIPTION OF THE DRAWINGS

Two examples of plant operating in accordance with the invention will now be described, by way of example, with reference to the accompanying drawings, in which.

Figure 1:
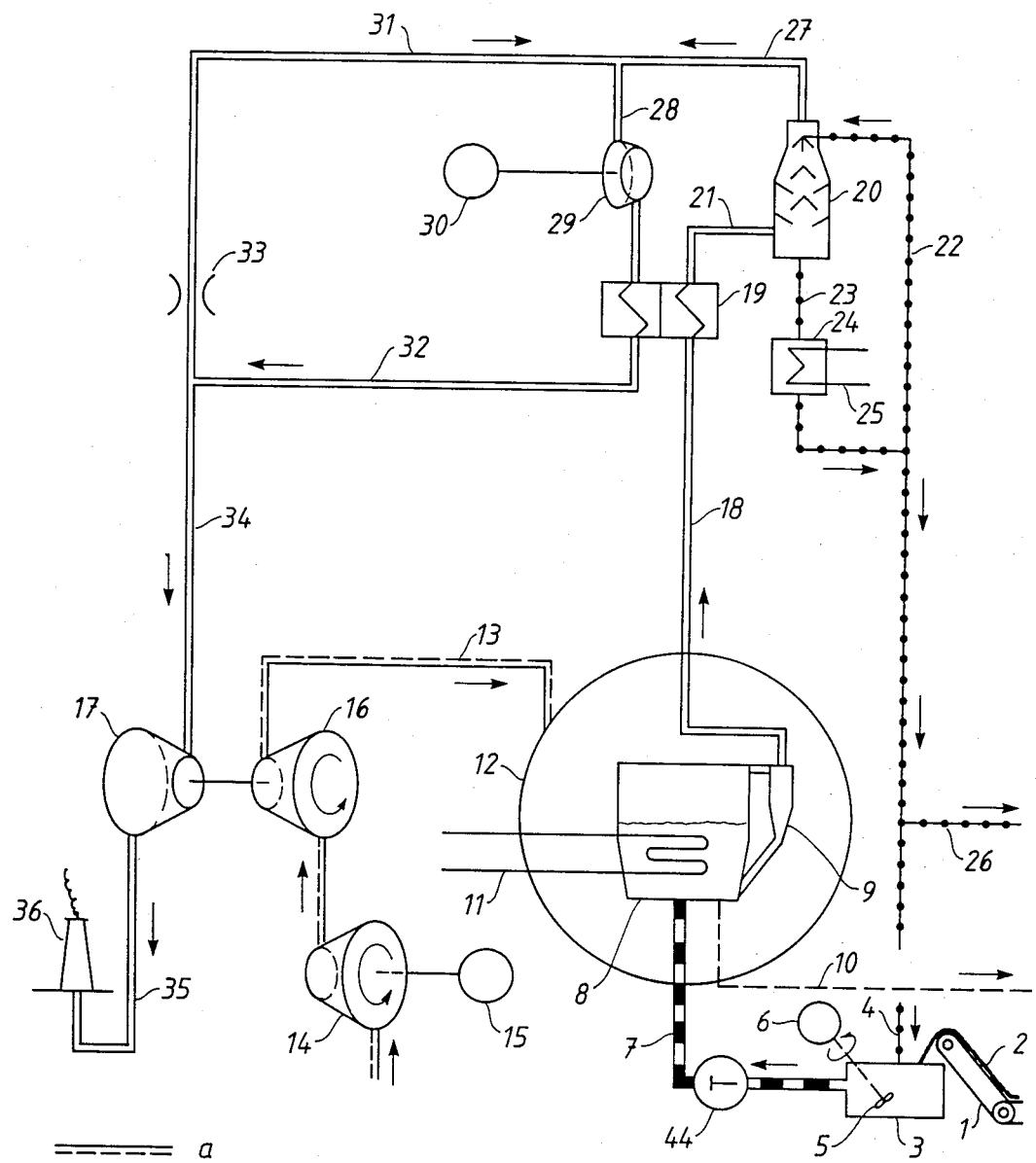
FIG. 1 shows in diagrammatic form a first plant for carrying out the method according to the invention.

In the drawings, conduits for different materials are marked in different ways, and the code for this marking scheme is shown by letter designations at the bottom of each Figure. In the codes, conduits for air are designated a, for flue gas b, for water c, for fuel d and for ashes e.

DESCRIPTION OF FIRST PREFERRED EMBODIMENT

The plant shown in FIG. 1 includes a device 1 for feeding coal 2, possibly mixed with a lime-containing material, to a container 3 where water is supplied from a conduit 4. The mixture of coal and water is formed into a slurry by means of a stirrer 5 which is driven by a motor 6. The slurry is fed, via a conduit 7 with a pump 44, into a combustion chamber 8, which can suitably be formed as a fluidized bed, provided with a cyclone 9 for separating coarse solid particles which flow off the bed with the flue gases and returning them to the bed. The combustion chamber 8 is also provided with a conduit 10 for the discharge of ashes. In the combustion chamber 8, a cooling circuit 11 is located for generating hot water or steam, for example for use in a district heating system or for operation of a steam turbine (not shown). The combustion chamber is enclosed within a pressure vessel 12, and is supplied with pressurized air via a conduit 13. Upon start-up of the plant, the air in the conduit 13 is compressed with a compressor 14 driven by motor 15, but during normal operation of the plant, the air is compressed by a compressor 16 driven by a gas turbine 17.

The pressurized flue gases pass from the combustion chamber via a conduit 18 to a regenerative or recuperative heat exchanger 19, where they are cooled, preferably without falling below the dew point for sulfuric acid, and from there, via a conduit 21 they pass to a scrubber 20. In the scrubber 20, both water vapor and sulfur trioxide are condensed on small downfalling cooling water droplets which are generated in the upper portion of the scrubber. In addition, ash and other solid particles and some other impurities are washed from the flue gases during its passage through the scrubber. Cooling water is supplied to the scrubber 20 via a conduit 22 and is discharged in heated condition via a conduit 23 to a heat exchanger 24, where the heat content of the cooling water is utilized in a circuit 25 (e.g. for use in a district heating system or for preheating of condensate). Some of the cooled water leaving the heat exchanger 24 is returned to the conduit 22 but since new water is constantly added to the flow by virtue of the condensation occurring in the scrubber, a further discharge of the cooled cooling water flow occurs along a conduit 26.

From the scrubber 20, the flue gases pass, via a conduit 27 and a conduit 28 through a fan 29 which is driven by a motor 30 and prior thereto are mixed with heated flue gases from a conduit 31, so that the flue gases, when passing through the heat exchanger 19, have a temperature exceeding the dew point for sulfuric acid. The temperature levels of the flue gases upstream of the inlet to the scrubber 20 and after the supply of hot gas via the conduit 31 are such that no condensation of sulfur trioxide can take place after the passage through the scrubber. The flue gases then pass from the heat exchanger 19 via a conduit 32 at the end of which a small proportion of the gas passes into the conduit 31 via a valve or other throttling means 33 while the residue flow into a conduit 34 and thus to the gas turbine 17 which drives the compressor 16 and possibly a generator (not shown). From the turbine 17, the flue gases escape via a conduit 35, at a temperature which exceeds the dew point for sulfuric acid under the prevailing conditions, out through a chimney 36.

EXAMPLE I

One example of the conditions prevailing during operation of a plant according to FIG. 1 is as follows:

The fuel in the conduit 7 is a slurry of coal in water containing 40 percent by weight of carbon. The temperature in the combustion chamber 8 is 850° C. The temperature in °C. and the pressure in bars which exist in some of the numbered conduits of the plant are set out in the following Table:

TABLE I

| Number of conduit in FIG. 1 | Temperature (°C.) | Pressure (Bars) |
| --- | --- | --- |
| 13 | 241 | 5.6 |
| 18 | 360 | 5.3 |
| 21 | 190 | 5.3 |
| 27 | 60 | 5.0 |
| 28 | 81 | 5.0 |
| 32 | 267 | 5.1 |
| 34 | 267 | 5.1 |
| 35 | 108 | 1.0 |

The ratio of useful energy to supplied carbon and electricity in the plant operating as described in FIG. 1 is 0.948.

DESCRIPTION OF SECOND PREFERRED EMBODIMENT

Figure 2:
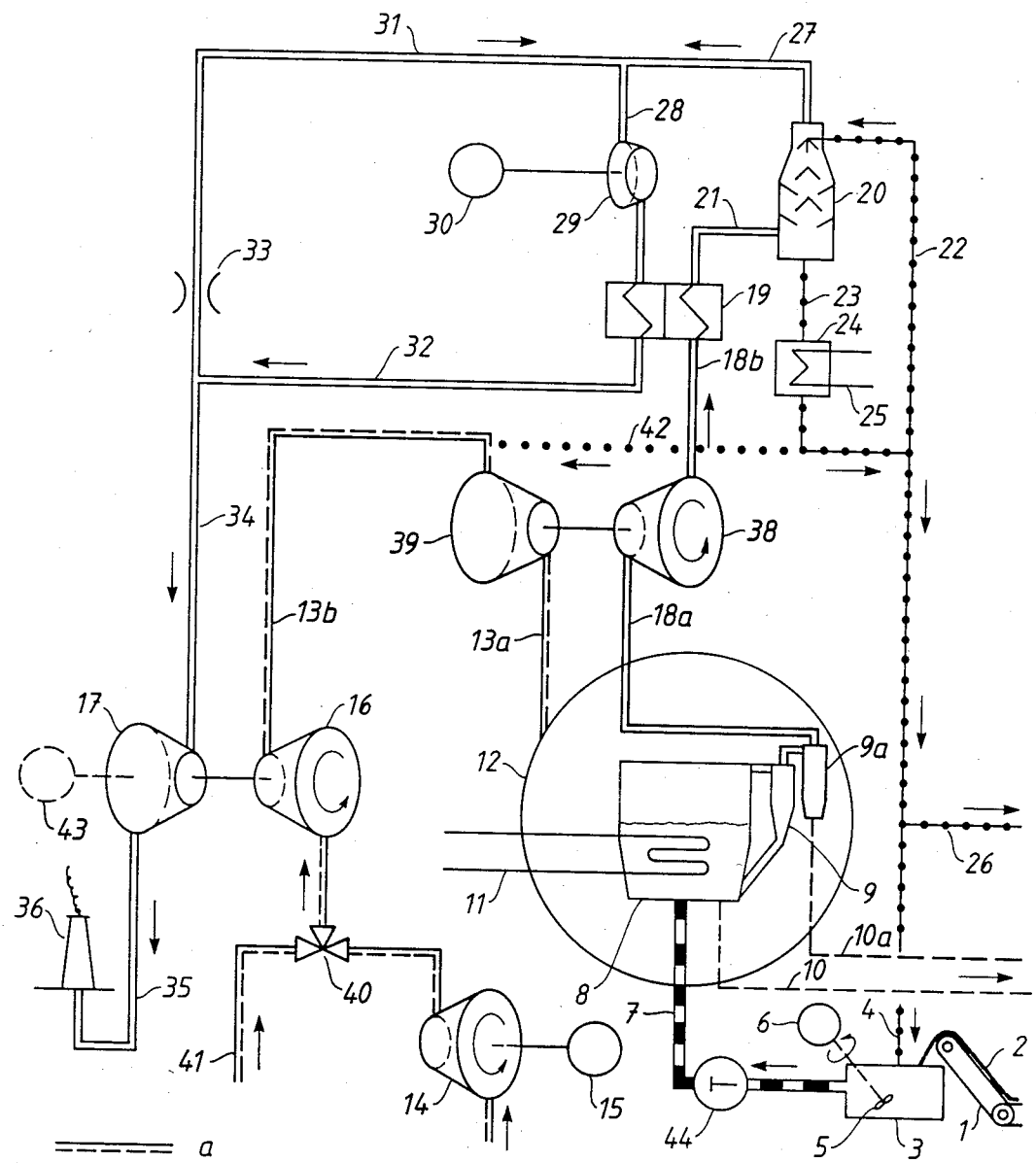
FIG. 2 shows schematically a second plant.

The plant shown in FIG. 2 comprises, in addition to the parts already described and shown in FIG. 1 and for which the designations used in FIG. 1 have been retained, the following parts: a second cyclone 9a which is connected to the cylone 9 and which is provided with a conduit 10a for the discharge of ashes, a gas turbine 38 which receives gas from a conduit 18a leading from the second cyclone 9a and feeds gas into a conduit 18b leading to the heat exchanger 19; a compressor 39, driven by the gas turbine 38, which via a conduit 13a is connected to the combustion chamber 8 and via a conduit 13b is connected to the compressor 16; a conduit 41 to the surrounding atmosphere connected to the compressor 14 via a three-way cock 40.

The plant shown in FIG. 2 operates in a manner analogous to the plant shown in FIG. 1 with the modifications in temperature and pressure which result from the use of the additional parts detailed above.

EXAMPLE II

An example of the conditions prevailing during operation of the plant shown in FIG. 2 is as follows:

The fuel in the conduit 7 is a slurry of coal in water containing 40 percent by weight of carbon. The temperature in the combustion chamber 8 is 850° C. The temperature in °C. and the pressure in bars which exist in some of the numbered conduits of the plant of FIG. 2 are set out in the following Table:

| Number of conduit in FIG. 2 | Temperature (°C.) | Pressure (Bars) |
| --- | --- | --- |
| 13b | 146 | 3.1 |
| 13a | 353 | 9.9 |
| 18a | 694 | 9.6 |
| 18b | 548 | 3.8 |
| 21 | 425 | 3.8 |
| 27 | 60 | 3.8 |
| 28 | 78 | 3.8 |
| 32 | 239 | 3.9 |
| 34 | 239 | 3.9 |
| 35 | 110 | 1.0 |

The ratio of useful energy to supplied carbon and electricity in the plant operating as described in FIG. 2 is 0.925.

DESCRIPTION OF FURTHER PREFERRED EMBODIMENTS

In a modified embodiment of the plant described in FIG. 2, water is added to the compressed air in the conduit 13b via a conduit 42. The temperature at the inlet side of the compressor 39 is then 61° C. With a temperature of 229° C. and a pressure of 9.9 bar of the air in the conduit 13a and with a temperature of 70° C. of the flue gases in the conduit 35, a ratio of useful energy to supplied carbon and electricity of 0.952 will then be obtained.

According to a further modified embodiment of the invention, water is supplied via the conduit 42 and a rotary electrical machine 43 is arranged on the axis of rotation of the gas turbine 17. The machine 43 can be used as a generator for utilizing excess energy generated in the turbine 17 and as a motor for starting the compressor 16. In the latter case, the compressor 14 is no longer necessary.

Various modifications can be made to the plants shown in FIGS. 1 and 2 and all such modifications falling within the following claims should be held to be within the scope and spirit of this invention.

What is claimed is:

1. A method for recovering energy from flue gases created during the combustion of a sulfur-containing, water-vapor generating fuel, in which pressurized flue gases are cooled while recovering a major part of the latent heat of evaporation of the water contained therein and while at least partially removing sulfur impurities contained in the flue gases, before the flue gases are expanded to atmospheric pressure in an expansion machine, characterized in that the cooling while recovering the latent heat of evaporation of water and while removing sulfur impurities is carried out by scrubbing with a flow of coolant liquid in drop form, in that the flue gases, after scrubbing are mixed with a proportion of heated flue gases which has been scrubbed previously and then had its temperature raised in a heat exchanger, so that the temperature of the flue gases after said mixing exceeds the dew point for sulfuric acid in the flue gases under the prevailing conditions, in that the flue gases, after such temperature enhancement, are led to a heat exchanger and in that thereafter the flue gases are expanded to atmospheric pressure in the expansion machine under conditions in which the temperature reduction produced by the expansion does not cause the flue gases temperature to fall below the dew point for sulfuric acid in the flue gases under the then prevailing conditions.

2. A method according to claim 1, characterized in that before the flue gases are cooled by scrubbing they are cooled in the said heat exchanger without the temperature falling below the dew point for sulfuric acid in the flue gases under the then prevailing conditions.

3. A method according to claim 1, characterized in that the combustion is carried out with compressed air and that water is supplied with the compressed air.

4. A method according to claim 2, characterized in that the combustion is carried out with compressed air and that water is supplied with the compressed air.

5. A method according to claim 1, characterized in that the flue gases at the inlet of the expansion machine have a temperature of at least 150° C.

6. A method according to claim 2, characterized in that the flue gases at the inlet of the expansion machine have a temperature of at least 150° C.

7. A method according to claim 3, characterized in that the flue gases at the inlet of the expansion machine have a temperature of at least 150° C.

8. A method according to claim 4, characterized in that the flue gases at the inlet of the expansion machine have a temperature of at least 150° C.

9. A method according to claim 1, characterized in that the flue gases at the outlet of the expansion machine have a temperature which exceeds ambient temperature.

10. A method according to claim 2, characterized in that the flue gases at the outlet of the expansion machine have a temperature which exceeds ambient temperature.

11. A method according to claim 4, characterized in that the flue gases at the outlet of the expansion machine have a temperature which exceeds ambient temperature.

12. A method according to claim 6, characterized in that the flue gases at the outlet of the expansion machine have a temperature which exceeds ambient temperature.

13. A plant for recovering energy from flue gases created during the combustion of a sulfur-containing, water-vapor generating fuel, in which pressurized flue gases are cooled while recovering a major part of the latent heat of evaporation of the water contained therein and while at least partially removing sulfur impurities contained in the flue gases, before the flue gases are expanded to atmospheric, comprising a combustion chamber for combustion of the fuel, a scrubber, connected to the combustion chamber via a first conduit, for the flue gases, means to feed coolant liquid in drop form to the scrubber to effect cooling of the flue gases while recovering latent heat of evaporation of water contained in the flue gases and while at least partially removing sulfur trioxide and other impurities, a heat exchanger connected to the scrubber via a second conduit for the flue gases, for heating the flue gases, a third conduit connected to the second conduit for mixing, with the scrubbed flue gases, a proportion of heated flue gases which were scrubbed previously and had its temperature raised, so that the temperature of the flue gases after such mixing exceeds the dew point for sulfuric acid in the flue gases under the prevailing conditions, and an expansion machine connected to the heat exchanger via a fourth conduit for expanding the flue gases to atmospheric pressure under conditions in which the temperature reduction produced by the expansion does not cause the flue gas temperature to fall below the dew point for sulfuric acid in the flue gases under the then prevailing conditions.

14. Plant according to claim 13, in which the heat exchanger is located both in the second conduit for heating the flue gases from the scrubber and in the first conduit for cooling the flue gases flowing from the combustion chamber to the scrubber whereby interchange of heat takes place between the flue gases flowing from the scrubber and the flue gases flowing to the scrubber.

15. Plant according to claim 13, in which the combustion chamber is provided with a supply conduit for air which includes two compressors and in which means is provided to supply water to the air in the supply conduit at a point between the two compressors.

16. Plant according to claim 14, in which the combustion chamber is provided with a supply conduit for air which includes two compressors and in which means is provided to supply water to the air in the supply conduit at a point between the two compressors.

17. In a method of recovering energy from flue gases resulting from the combustion of a sulfur-containing water-vapor generating fuel in which heat energy is extracted from and sulfur impurities are removed from, the flue gases as these are cooled under pressure, the improvement which comprises effecting some heat energy extraction and impurity removal by contacting the flue gases with liquid droplets, bringing the flue gases, upstream and downstream of said droplet contact into heat exchange relationship in a heat exchanger, and returning a proportion of the flue gases flowing downstream of the heat exchanger back into the flue gases at a location upstream of the heat exchanger but downstream of the said droplet contact.

18. Combustion plant for burning a water-vapor generating fuel that contains sulfur which comprises a combustion chamber in which the fuel is burnt to create flue gases, means to supply fuel and combustion air to the combustion chamber, a first flue gas conduit leading from the combustion chamber, a scrubber connected to the first flue gas conduit with means therein to contact flue gases passing therethrough with drops of a liquid coolant, a second flue gas conduit leading from the scrubber to lead scrubbed flue gases away therefrom, a heat exchanger thermally interconnecting flue gases in said first and second flue gas conduits, a third flue gas conduit adapted to feed a proportion of the flue gases leaving the heat exchanger from the second flue gas conduit back to the second flue gas conduit at a point of the second flue gas conduit position between the scrubber and the heat exchanger, an expansion machine receiving the residue of the flue gases from the heat exchanger, and a waste stack receiving flue gas from the expansion machine.

19. Plant according to claim 18, further comprising means to pressurize the combustion air fed to the combustion chamber which means are powered by the expansion machine.

20. Plant according to claim 19, further comprising means to add water to the combustion air.

* * * * *